Aug. 14, 1951    M. C. WILLIAMS ET AL    2,564,089
CODED CARD HANDLING MACHINE

Filed Oct. 1, 1948    5 Sheets-Sheet 1

INVENTORS
MALCOLM C. WILLIAMS
FLOYD L. WILLIS
BY
Robert Falwider
ATTORNEY

Aug. 14, 1951  M. C. WILLIAMS ET AL  2,564,089
CODED CARD HANDLING MACHINE
Filed Oct. 1, 1948  5 Sheets-Sheet 4

INVENTORS
MALCOLM C. WILLIAMS
FLOYD L. WILLIS
BY
Robert W. Fulwider
ATTORNEY

Patented Aug. 14, 1951

2,564,089

UNITED STATES PATENT OFFICE 2,564,089

CODED CARD HANDLING MACHINE

Malcolm C. Williams, North Hollywood, and Floyd L. Willis, La Crescenta, Calif.; said Willis assignor to said Williams Application October 1, 1948, Serial No. 52,346

27 Claims. (Cl. 35—9)

The present invention relates generally to automatic card-handling machines, and more particularly, to a machine of this type which is adapted to present a series of cards visually, one at a time, for the purpose of exhibiting a question printed on the card and determining the correctness of the answers indicated by the observer.

Machines of the type just described have many uses. They are used, for example, in the mass training of personnel in specialized arts and sciences, such as military aviation, machine shop practice, and so forth. Such machines are also used in administering so-called intelligence quotient examinations and compiling the results. Still other uses may be in the field of advertising and amusement.

Essentially, a quiz machine, as they are sometimes called, for the above purposes should provide for the exhibiting of a series of questions, one question at a time, and the exhibiting thereafter of the correct answer to each question. It is further provided in most quiz machines that the observer of the questions may indicate what he considers to be the correct one of a number of possible answers by pressing a button, lever or other indicating device. Such preference is recorded in the machine and correlated with the particular question, so that after a series of questions have been answered in the above manner, the percentage of correct answers or "score" of the observer is indicated by the machine.

Some of the foregoing basic principles have been embodied in various machines heretofore provided, but in most machines heretofore available, there have been various disadvantages which have prevented the system from coming into wide use. Among such disadvantages are the following:

If the series of questions to be answered is presented on a continuously moving medium, such for example, as a tape or a strip film, the machine lacks universality in that the number of questions in any group cannot be changed without replacing the entire record strip. Furthermore, it is impossible to remove particular questions and replace them with others. Still further, such a machine does not provide for a wide selection of different types of examinations or question groups in that each group of questions must be made up as an entire length of film or record strip. Thus, it will be seen that one desirable feature of machines of the class described is that each question be presented on a single card so that various selections of question groups may be made from a large supply of individual cards.

While individual card machines have been used in the past, they have usually been so constructed that only a predetermined number of cards may be used in the machine—neither more nor less. Furthermore, such number of cards is usually divided up into groups of questions, each group having the same number of cards, and mechanical provision is made elsewhere in the machine so that the machine is stopped each time a group out of the entire supply of cards has been exhibited. Thus, if for any reason the machine should get out of synchronism, the machine will thereafter overlap successive groups of questions, i. e., the machine will stop partway through a group of questions rather than at the end of the group as originally intended. Still another disadvantage of the last-stated type of card quiz machine is that there must always be the same number of questions in any group.

Also inherent in many of the card type machines previously manufactured were certain mechanical difficulties in the handling of the cards and exhibiting of the same. One such difficulty arises from the fact that heretofore it has been customary to exhibit the question on one part of the card, for example, the front, and the answer on another part, for example, the back, in such a way that when the answer is exhibited, the question is no longer in view. It has been found to be advantageous, however, to permit the observer to refer back to the question when viewing the answer, particularly when such questioning machines are to be used for training purposes.

Bearing in mind the foregoing discussion of desirable features in a quiz machine of the class described, it is a major object of our invention to provide a quiz machine employing coded cards, some of which are adapted to control the operation of the machine whereby groups of various numbers of questions may be employed in the machine, such groups being separated by the aforesaid machine-controlling cards referred to herein as "break" cards.

Another object of the invention is to provide a machine of the class described which is capable of receiving and passing through the machine substantially any number of cards that may be desired.

Still another object of the invention is to provide means for successively presenting a question and answer to the same in such a manner that the observer may view both the question and the answer at the same time.

A further object of the invention is to provide in a machine of the class described, coding means on the cards such that the score of the observer may be recorded.

A still further object of the invention is to provide in a quiz machine of the class described, means for recording the number of times certain answers of a select group are correctly answered whereby to compile statistical data regarding public knowledge and interest.

Yet another object of our invention is to provide automatic timing means in a machine of the class described whereby a certain time is allowed for the answering of each question and for the interlocking of such timing means with the scoring means above mentioned, in order that the ultimate score will reflect the speed with which the questions are answered.

In general, it is an object of our invention to provide a quiz machine which is adaptable for a wide variety of purposes without substantial modification of the machine itself, merely requiring the supplying of different types of cards for different applications.

For a description of a machine embodying the invention from which the foregoing and other advantages will appear, a reference should now be had to the drawings wherein.

Before proceeding to a detailed structural description of the machine, the basic functional elements will be described. Broadly speaking, the quiz machine embodying our invention which is illustrated herein includes the combination of the following means.

Magazine

A card-receiving magazine, indicated by the reference character 10, is provided which is adapted to receive a stack 11 of cards 12, such stack comprising any of a wide range of numbers of cards. The magazine 10 is positioned near the rear of the machine and is so arranged that, as the cards 12 are successively presented for observation, they are withdrawn from the bottom of the aforesaid stack and thereafter returned to the top of the stack.

Cards

The question cards 12 employed in the machine herein illustrated are rectangular in shape, and are presently, although not necessarily, presented horizontally, i. e., with the long side of the rectangle at the top. Formed in each card 12 is a notch 13 which may be positioned at any of a number of discrete points along the top edge of the card, the positioning of the notch 13 being coordinated with the correct answer to the question on the card and certain of the cards, i. e., break cards, having the notch in a particular position to operate control means hereinafter to be described.

On the question cards themselves, the question is arranged in a left-hand "question" area 14 on the front of the card and may be in printed form or graphic form as desired. The questions are of the multiple answer selection type, the group of possible answers appearing in the question area 14 of the card. The correct answer to the question, together with certain explanatory matter, if desired, is printed in a right-hand "answer" area 15 of the card, immediately adjacent the question area 14 so that when the entire face of the card is exposed, the correct answer may be compared with the question.

Card-withdrawing means

The cards are withdrawn from the bottom of the aforesaid stack by a reciprocating carriage or table 20 which moves rearwardly of the machine to underlie the stack and then forwardly, having knife members 21 which carry forward the lowermost card of the stack 11.

Card-exhibiting means

As the card is brought forward from the magazine 10, as just described, it enters a pair of jaws 23 which move the same upwardly to a position adjacent a sensing station under a viewing window 24. During the time that the card is being brought forward and raised to a position adjacent the viewing window 24, this motion is not visible to an observer by reason of the fact that a preceding card 12 is already in place in the window. Upon withdrawal of said preceding card, as will be hereinafter described, the card held in the aforesaid jaws, having been thrust upwardly by a pair of ejectors 25, is visible in the window.

The right-hand portion of the window 24, through which the answer area 15 is to be viewed, is initially obscured by a shutter 26. When the observer has indicated his answer, or when the prescribed length of time for answering the question has elapsed, the shutter is withdrawn and the answer is visible.

Card-return means

After the card has been exhibited, the question answered, and the score recorded, the card is moved out of the window 24 by means of a pair of opposed rollers 30—31, moving upwardly and rearwardly and being discharged into the top of the magazine 10 to fall on top of the aforesaid stack 11.

Scoring means

Arranged along the upper edge of the viewing window 24, and out of sight of the observer, is a series of electrical switches 33. These switches have operating levers 34 which project downwardly into position to be engaged by the upper edge of the successive cards 12 as they are positioned under the viewing window 24. All of the switch-operating levers 34, except one which is adjacent the notch 13 in the particular card then in place in the viewing window, are moved by the card to operate the switch as the card is moved in place. Thus, one only of the various switches is in an unoperated condition during the exhibiting of any particular card. The switches are connected through a circuit hereinafter to be described in more detail so that if the correct answer is indicated by pressing the correct one of a number of buttons 35 on the front of the machine, a score counter 36 is advanced. If any one of the incorrect buttons is pressed, the shutter 26 is withdrawn from the answer area, but the score counter 36 is de-energized so that the correct answer may not thereafter be recorded.

One of the switches 33' is so positioned so as to be responsive only to the notch 13 in the break cards. This break switch, as it is termed herein, serves to energize a circuit which clears or resets the score counter 36 at the beginning of the next successive group of questions following the break.

A timer 37 is provided in connection with the scoring means and is adapted to de-energize the score counter and prevent recording the score of an answer, if no answer has been indicated after a predetermined "exposed" period of the question. A warning light 38 is mounted under a window 43 adjacent the front of the machine so that the observer is warned just prior to the termination of the answer period above described.

Each of the break cards is printed with a set of instructions for operating the machine and an operating button 39 is provided among those mounted on the front of the machine which is pressed to advance the next successive card under the window after the preceding question has been answered or the answer period has elapsed.

Having described the basic functional elements of the quiz machine incorporating our invention, the structural details will now be described. The entire unit is mounted on a base 40 and provided with a housing 41, which housing has mounted in the forward sloping surfaces thereof the card-viewing window 24, and a pair of smaller windows 42 and 43 through which the score counter and warning light, respectively, may be observed.

A sub-base 45 is mounted to the upper surface of the lower base 40 and carries secured thereto a number of upright stanchions supporting the various mechanical elements of the machine. The magazine 10 which receives the stack 11 of cards 12 is formed with two vertical side pieces 49 which are attached to the sub-base 45 whereby to support the magazine thereabove. The magazine 10 also includes transverse forward and rearward walls 46 and 47, which are arranged to form a box-like receptacle for the card stack 11. The rearward wall 47 is hinged at 48 so that the same may be opened to the position indicated by phantom line in Figure 4, whereby the cards 12 are initially installed in the magazine. The upper portion of the rearward wall 47 of the magazine 10 is curved forwardly so that cards discharged into the magazine by the feed roller 30 will, upon striking the rearward wall 47, be directed downwardly to the stack 11.

The bottom of the magazine 10 is formed by a horizontal plate 50 which forms part of the reciprocating table 20. As can be seen best in Figure 4, the longitudinal dimensions of the plate 50 are such that in spite of the reciprocal motion thereof, a sufficient portion of the plate 50 is always in place under the stack of cards 11 to support the same. It should also be noted that the lower edge of the forward transverse wall 46 is so spaced above the plate 50 as to permit the passage of only one card thereunder during the forward motion of the reciprocating table 20.

In order to permit the reciprocating motion of the table 20, this member is mounted on a pair of longitudinal tracks 51, which are in turn supported from the sub-base 45 by vertical stanchions 52 and 53. The plate 50 is supported on the tracks 51 by means of downwardly extending brackets 55, each carrying transverse rollers 54 above and below the tracks 51.

The table 20 is driven in its reciprocal motion by a drive motor 60 which rotates a crank 61, the outer end of which is pivotally connected by a connecting rod 62 and a multiplying link 63 to a bracket 64 secured to the bottom of the plate 50. It will be noted that the lower ends of the multiplying link 63 is pivotally connected to the sub-base 45 by means of a bracket 65 secured to the sub-base 45 and carrying a pin 66 movable in a slot 67 in the link 63. Thus the reciprocal motion of the table 20 is approximately twice the total throw of the crank 61 by reason of the multiplication achieved through the link 63.

A cam disc 70 is also rotated by the motor 60, the cam 70 having a dwell 71 therein into which an actuating roller 72 of a switch 73 falls, the purpose being to interrupt the motor circuit when the crank 61 has made a single revolution, thus permitting but one reciprocal cycle of movement of the table 20 each time the cycle of operation is initiated. Details of the connection of the switch 73 will be described in more detail hereinafter.

As can be seen best in Figure 4, the bracket 64 secured to the under surface of the plate 50 is formed with a longitudinal slot 75 in which a sliding pin 76 rides, the pin being connected to a lost motion connecting rod 77, the purpose of which will be described hereinafter. Thus, when the table 20 reaches its foremost position during its reciprocal travel, the pin 76 is engaged by the rearward end of the slot 75, thrusting forwardly on the connecting rod 77.

The connecting rod 77 is pivotally attached at its foremost end by a cross bar 74 to crank arms 78, rotatably carried on a transverse rock shaft 79. Thus, as the connecting rod 77 is thrust forwardly, as aforesaid, the crank arms 78 are rocked in a clockwise direction, as indicated in Figure 5. A tension spring 83, connected to the cross bar 74 and anchored to a stanchion 52a, pulls rearwardly on the cranks 78, normally holding the jaws 23 in the uptilted position illustrated in Figure 4.

Figures 4, 5, 6:
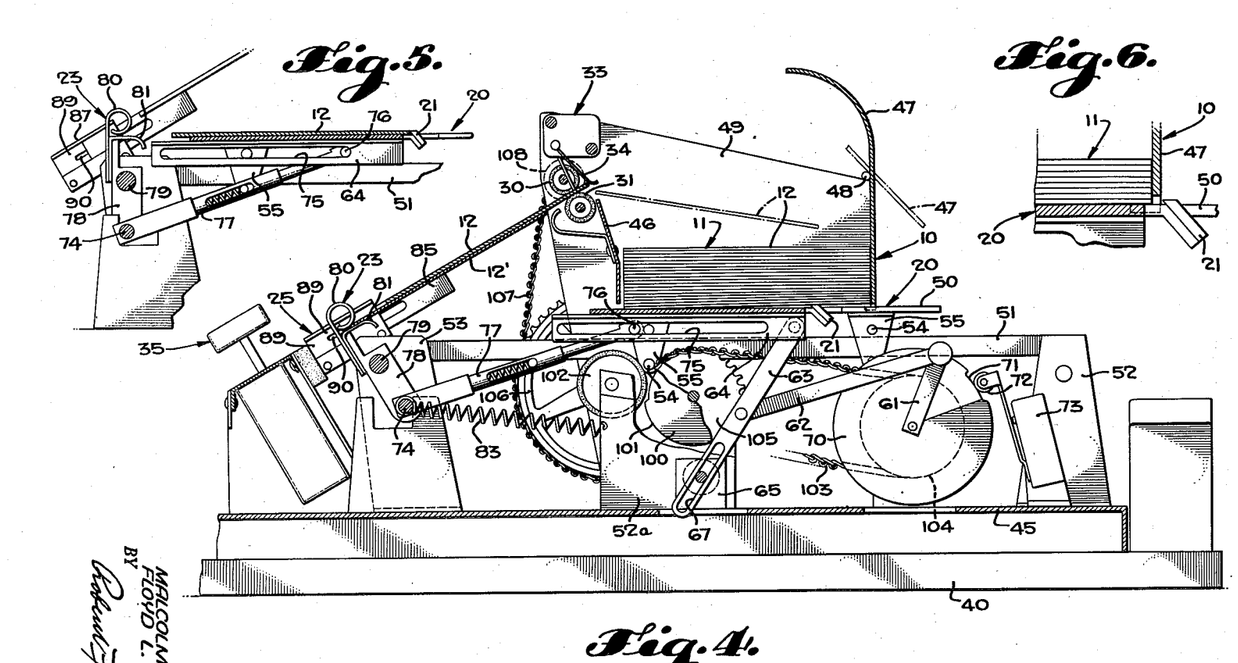
Figure 4 is an elevational section taken on the line 4—4 in Figure 3.
Figure 5 is a fragment of Figure 4, showing the position of the parts in a different portion of the operation cycle.
Figure 6 is an enlarged portion of Figure 4, showing still another operational position, wherein a card-advancing table is in position preparatory to withdrawing a card from the bottom of a stack of cards.

Secured to upper extension of the crank arms 78 is the aforementioned pair of card-receiving jaws 23, each of said jaws being formed with upper and lower spring members 80 and 81, which are positioned and adapted to receive the forward edge of the card therebetween, as can be seen in Figure 4. When the table 20 reaches its forward position, the jaws 23 are rocked against the urging of the spring 83 into a horizontal position, whereby to receive the forward edge of the card 12 which is resiliently gripped between the members 80 and 81. When the table again moves rearwardly, the spring 83, pulling rearwardly on the cross bar 74, rotates the crank arms 78 in a counterclockwise direction, swinging the card upwardly into the position shown in Figure 4 and indicated by the reference character 12'. As previously stated, all of the foregoing movements of the card from the bottom of the stack 11 into the position indicated by the reference character 12' are not visible through the window 24 by reason of the fact that a preceding card 12 lies under the window 24, being held in this position by being gripped between the resilient discharge rollers 30. It should be also noted that the position of the notch in the upper edge of the card in the position 12' is not visible to the observer.

Before the jaws 23 may be rocked downwardly to receive the forward edge of the card 12, it is necessary that the preceding card held by the jaws in the position indicated in Figure 4 be ejected from the jaws 23. For this purpose, a pair of slidable ejectors 25 are mounted on sloping tracks 85, the tracks 85 being positioned on either side of the card path and supported by upright stanchions 86 secured to the sub-base 45. The ejectors 25 each include an angular sheet metal member 87 which slidably straddles the tracks 85, being urged rearwardly by a tension spring 88. Secured to the sheet metal frame 87 is a block 89 having a card-receiving groove 90 formed in the forward edge thereof, as shown in Figures 4 and 5.

Each of the ejector frames 87 has formed thereon an outwardly extending flange 91 positioned and adapted to be engaged by a pressure roller 92, rotatably mounted on the upper end of a crank 93, two such cranks being provided and secured to the ends of the rock shaft 79. Rotation of the cranks 93 in a clockwise direction causes the rollers 92 to press forwardly on the flanges 91, carrying the ejectors 25 upwardly along the inclined tracks 85.

A downwardly extending arm 94 of the crank 93 on the near end of the rock shaft 79 (in Figure 7) has formed thereon an outwardly extending crank pin 95 adapted to receive thrusting motion in a forward direction such as to rock the two cranks 93 in a clockwise direction, as above described.

Pivotally secured to the near side of the reciprocal table 20 is a thrust rod 96 which, by reason of its pivotal connection, hangs downwardly with its lower edge slidably supported on the crank pin 95. Part way along the lower edge of the thrust rod 96 is a shoulder 97, so positioned that when the table 20 approaches the forward end of its travel, the shoulder 97 engages the pin 95, thrusting forwardly in the direction of the arrow indicated on Figure 7, to rock the crank shafts 93 in a clockwise direction to move the ejectors 25 upwardly, as previously described.

Such upward motion of the ejectors 25 engages the forward edge of the card then held in the jaws 23, said forward edge entering the notch 90 in the block 89 whereby the card is carried forwardly out of the jaws 23, being moved upwardly by the ejectors 25 until the upper edge of the card just enters between the discharge rollers 30. As will be hereinafter described, the preceding card immediately above the card held in the ejectors 25 has been discharged by the rollers 30 into the magazine 10, the intermediate position being shown in phantom line in Figure 4.

Figure 7:
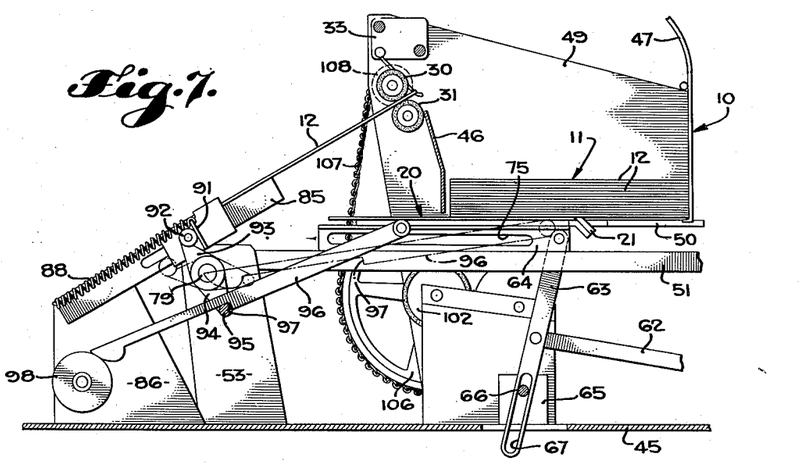
Figure 7 is an elevational fragmentary section, taken on the line 7—7 in Figure 3.

As the ejectors 25 reach the upper end of their travel along the tracks 85 and the card carried thereby is received between the rollers 30, the forward-lower end of the thrust rod 96 encounters a rotatable circular boss 98 secured to one of the stanchions 86. The forward end of the thrust rod 96 being beveled, as shown in Figure 7, this member rides up on the boss 98, disengaging the shoulder 97 from the crank pin 95 and permitting the tension spring 88 to return the ejectors to their initial position, indicated in Figure 4.

The proportioning of the thrust rod 96 and the position of the shoulder 97 thereon is such that the operation of the ejectors to move the card upwardly into position between the rollers 30 takes place just prior to the rocking motion of the jaws 23 preparatory to receiving the next card from the reciprocal table 20.

As previously mentioned, the card which is exposed under the window is discharged rearwardly into the magazine just prior to the movement of the ejectors 25, as previously described. Thus it will be seen that the rollers 30 must be rotated intermittently, such rotation being desired only for a period long enough to move a card from its exposed position in the window 24 rearwardly into the stack 11. Such intermittent rotation of the rollers 30 is accomplished by means of a mulitated roller drive comprising a drive roller 100, having a peripheral lobe 101 formed thereon which is adapted to engage a rubber-faced driven roller 102 mounted adjacent the drive roller 100. The drive roller 100 is continuously rotated by means of a sprocket chain 103 which connects the roller 100 with the drive motor 60 by means of sprockets 104 on the motor shaft, and 105 on the shaft of the drive roller 100. Thus it will be seen that once during each revolution of the drive motor shaft, the driven roller 102 is rotated by an amount determined by the peripheral length of the lobe 101. The driven roller 102 is in turn connected through a sprocket drive comprising drive sprocket 106, a chain 107, and a driven sprocket 108, to the shaft of one of the discharge rollers 30. It will be seen that, due to the relatively large size of the drive sprocket 106 as compared with the driven sprocket 108, the roller 30 connected with the latter makes several revolutions as the result of a partial revolution only of the driven roller 102. The extent of the lobe 101 is made just sufficient to rotate the roller 30 sufficiently to discharge the card, as previously described. By the time the ejectors 25 move the next successive card into position between the rollers 30, they have just come to rest after driven rotation, as previously described. Thus the card is supported under the window 24 by the pressure of engagement of the rollers 30.

Having described the individual elements for moving the cards from the bottom of the stack 11 forwardly, up under the window 24, through the discharge rollers 30, and back to the stack 11, the entire operation will now be described in the order of its occurrence.

The motor 60 is energized to start rotation of the crank shaft 61 in a clockwise direction. The table 20 is moved through the operation of the crank shaft 61, the connecting rod 62 and the link 63, first rearwardly to position the card knives 21 behind the rearmost edge of the lowermost card in the stack 11, and then forwardly to carry said knife-engaged card forwardly toward the jaws 23. During the initial portion of the table movement, the jaws 23 are in the position indicated in Figure 4, and remain in this position until the rearmost end of the slot 75 engages the pin 76 to thrust forwardly on the connecting rod 77. Concurrently with motion of the table 20, the rollers 30 are rotating by reason of the intermittent drive 100—102 to discharge the then exposed card rearwardly into the magazine 10. As the table 20 moves forwardly, the thrust rod 96 slides over the pin 95 until the shoulder 97 engages therewith, actuating the ejectors and moving the jaw-held card upwardly into gripping engagement with the rollers 30, which have by this time ceased their driven rotation. Thereafter, the rearward end of the slot 75 engages the pin 76 to rock the jaws 23 forwardly as previously described. Thereafter, the forward edge of the card 12 carried by the table 20 enters between the jaw member 80—81 and is gripped thereby. Thereafter, the table moves rearwardly until the dwell 71 enters under the switch-actuating roller 72, causing the switch 73 to interrupt the power delivered to the motor 60, and terminating the operation. As soon as the table 20 starts its rearward motion and relieves the pressure of the connecting rod 77, the spring 83 tilts the jaw-held card upwardly, as shown in Figure 4.

Figure 8:
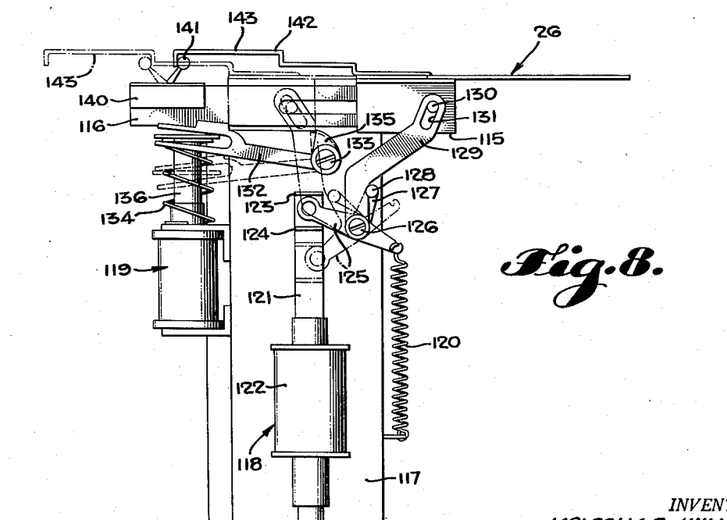
Figure 8 is an enlarged elevational section taken on the line 8—8 in Figure 3, certain parts being omitted to reveal underlying portions of the mechanism.

It will be remembered that when a card 12 is initially exposed in the window 24, the right-hand question area thereof is obscured by a shutter 26. After a predetermined answering time has elapsed, or when the operator has selected an answer by pressing one of the buttons 35, the shutter 26 is moved to the right to expose the answer in the area 15. Details of the shutter-moving mechanism are illustrated in Figure 8.

It will be seen that the shutter 26 is carried by a carriage 115, slidably mounted on a transverse track 116, the track being supported on a stanchion 117 secured to the sub-base 45. In general, the actuation of the shutter is by means of two solenoids 118 and 119, the former operating to withdraw the shutter (to the right in Figure 2) and the latter operating through a latch mechanism to release the shutter and permit a tension spring 120 to return it to the answer-covering position indicated in full line in Figure 2.

Figure 3:
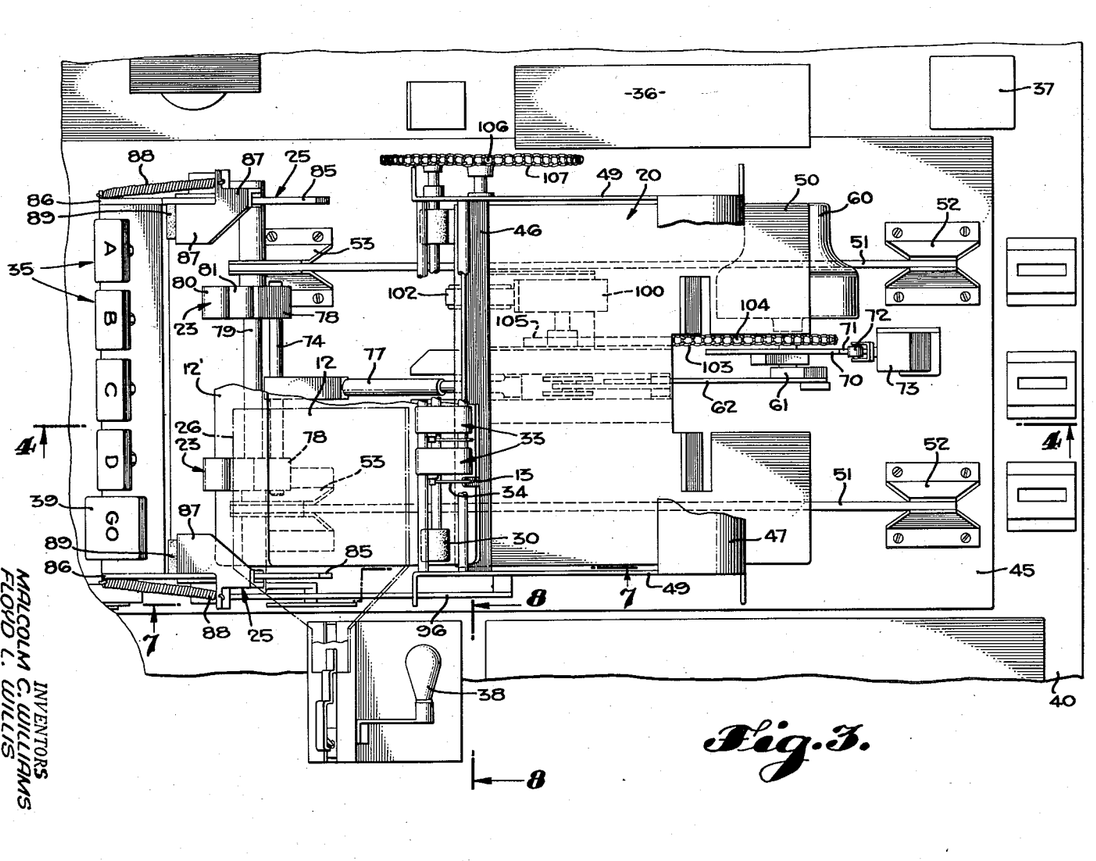
Figure 3 is a partial plan view of the machine illustrated in Figure 1, certain parts being broken away to reveal underlying parts.

The linkage between the shutter-withdrawing solenoid 118 and the shutter 26 includes a core 121 adapted to be drawn downwardly into the solenoid coil 122 when the latter is energized, said core 121 being operatively connected by means of a pair of forwardly projecting flanges 123 and 124 to a bell crank 125, pivotally supported on a pivot screw 126. The bell crank 125 carries on an upwardly projecting arm 127 thereof a pin 128 which is positioned and adapted to engage a Z-shaped lever 129, also pivoted on the pivot screw 126. The upper end of the lever 129 is connected by a pin 130 and slot 131 connection to the carriage 115, whereby rocking movement of the lever 129 (to the left in Figure 3) withdraws the shutter 26.

When the shutter 26 is withdrawn to its "open" position, it is caught by a latch member 132 pivotally mounted on a pivot screw 133. A compression spring 134 urges the latch member 132 upwardly whereby to normally hold the shutter 26 in retracted or "open" position by virtue of the engagement of a pawl-like portion 135 with the forward end of the carriage 115. The open position of the shutter 26 is indicated in phantom line in Figure 8.

Upon energization of the solenoid 119, a core 136 therein, which is engaged by a yoke connection with the latch member 132, is pulled downwardly, thus rotating the latch member 132 in a counter-clockwise direction to the position shown in dotted line in Figure 8, whereby to release the pawl member 135 and permit the spring 120 to urge the lever 129 in clockwise rotation to move the shutter 26 to closed or answer-covering position.

Mounted on the rear of the track 116 (to the left in Figure 8) is a conventional toggle switch 140 having an upwardly extending operating lever 141. Secured to the shutter 26 is a switch-actuating member 142, having its left-hand end formed with a downwardly disposed yoke-like opening 143, embracing the switch-operating lever 141. Thus, as the shutter moves from closed to open position, or vice versa, the sides of the yoke 143 engage the switch-operating lever 141 and operate the same to open or close the switch, depending on the direction of motion of the shutter. The arrangement of the switch is such that when the shutter is in closed position, the switch is closed, and when the shutter is in open position, the switch is open.

Figure 9:
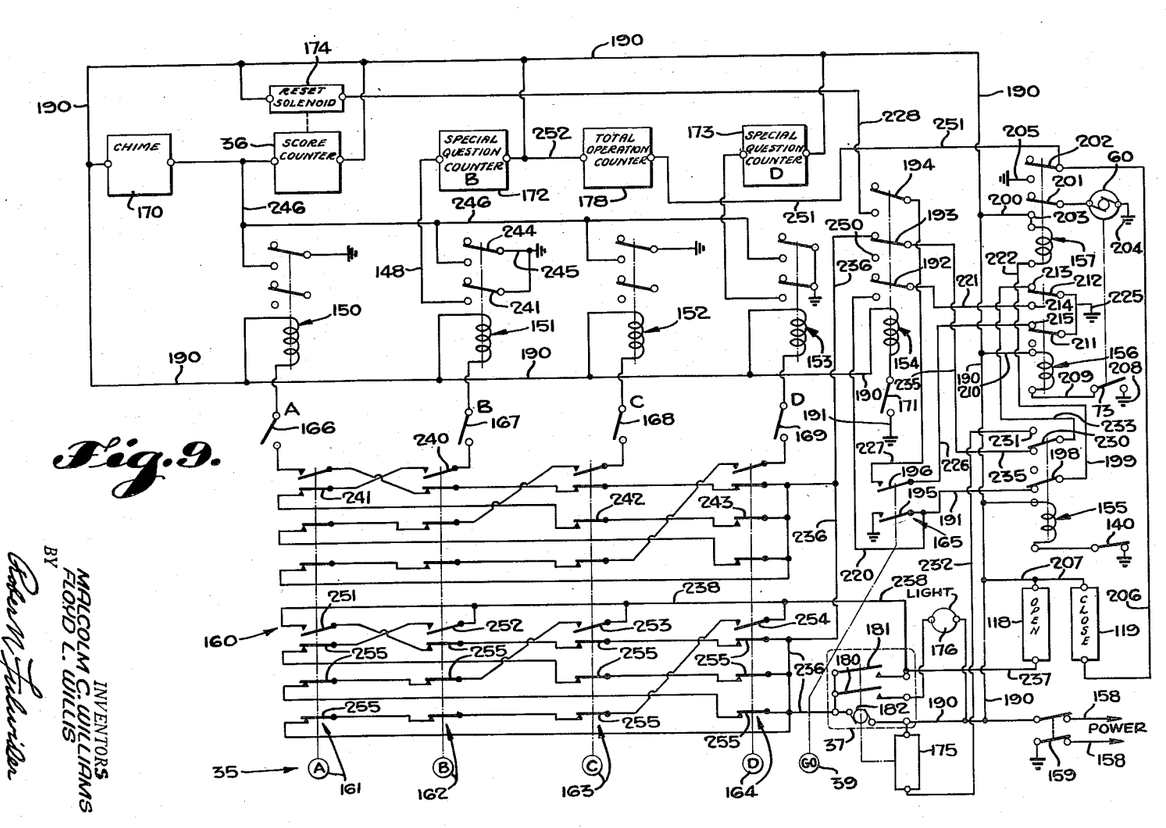
Figure 9 is a circuit diagram of the electrical components employed in the machine illustrated in Figure 1, et seq.

For a description of the electrical circuit, reference should now be had to Figure 9. In general, the electrical components of the device under discussion comprises a number of manually operated and mechanically operated switches, a number of multiple-pole relays, a number of solenoids, counters, and other elements, which serve to coordinate the movement of the cards, the operation of the shutter, and the recordation of the score. While as a matter of practical design, it may be preferable to select electrical components which operate on various different voltages, for purposes of simplicity the herein described device is shown as operating on a single voltage.

Before proceeding with a detailed description of the operation of the circuit, the basic components thereof may be functionally described as follows. There are a total of eight relays employed, four of which, 150 through 153, are double-pole, double-throw, and are operated individually whenever an appropriate answer button 35 is depressed. One of the relays 154 is three-pole, double-throw, and is actuated whenever a break card is in the viewing window 24. Another of the relays 155 is double-pole, double-throw, and is actuated by the closing of the shutter switch 140, which in turn is actuated by the opening and closing of the shutter. Still another relay 156 is double-pole, double-throw, and is actuated by the motor-limiting switch 73, which in turn is actuated by the cam 70. The final relay 157 is double-pole, double-throw, and is actuated by the operating button 39, depression of which serves to initiate the cycle of operation of the machine.

The push buttons 35 and the operating button 39, hereinafter called the "go" button, all operate switches which are part of a compound push button switch of the type commonly used as a station selector switch in radio receiving sets. The mechanical construction of the switch is such that when depressed, the buttons 35 remain depressed while the "go" button 39, when depressed, unlocks the other buttons and will itself return to normal undepressed position when released. The switches operated by the four answer buttons 35 are indicated by the reference characters 161 through 164 in the drawings, while the reference character 165 identifies the switch operated by the "go" button 39.

The sensing switches 33, previously referred to, which are actuated by the upper edge of the cards as they appear in the viewing window 24, are individually identified by the reference characters 166 through 169, and each of these sensing switches is responsive to a particularly positioned notch in the upper edge of the card, i. e., the left-hand notch position activates switch 166, the next notch to the right activates switch 167, etc. The switches 166—169 are all closed when no card is in the window and are, all but one, opened by a card being placed in the window, said one remaining closed.

Figure 1:
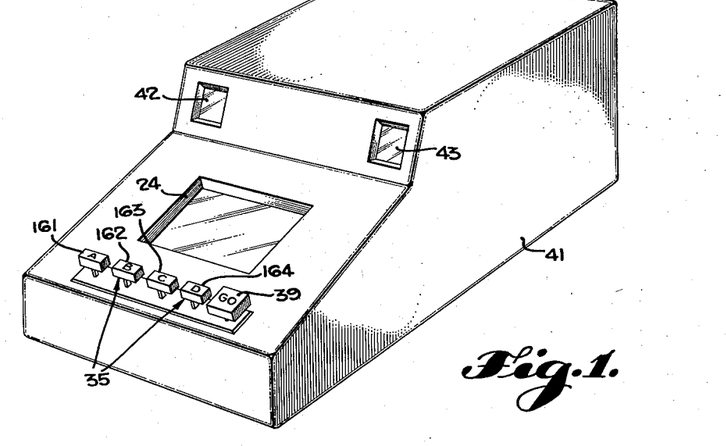
Figure 1 is a perspective view of a quiz machine embodying the present invention.
Figure 2:
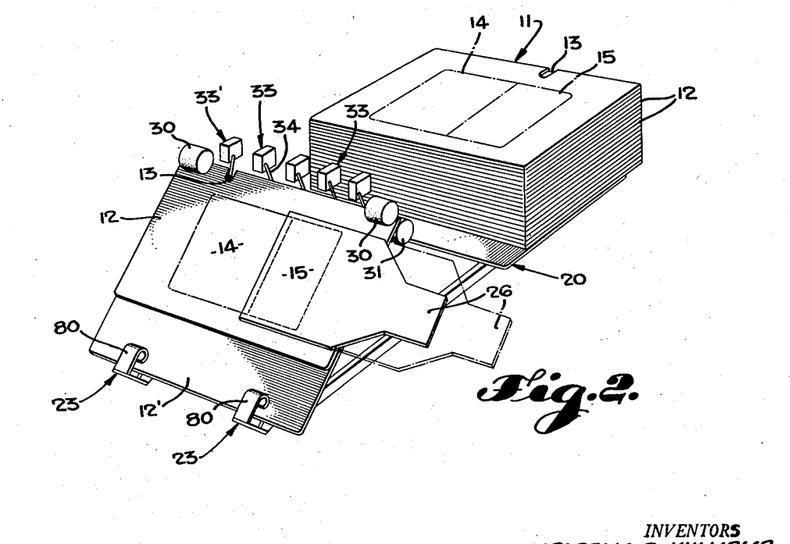
Figure 2 is a semi-schematic drawing, illustrating the spacial relationship of various basic elements of the machine, the housing and other details being omitted.

One of the sensing switches 33, i. e., that to the extreme right in Figure 2, is denominated the break card sense switch, identified in the wiring diagram by the reference character 171. When a break card is in the viewing window 24, the switch 171 is closed.

The motor limit switch 73 is so adapted that the switch is closed when the motor is in any position other than the "rest" position with the actuating roller 72 in the dwell 71 of the cam 70.

As has already been described, the shutter switch 140 is so arranged that when the shutter is open, the switch is open, and vice versa.

The score counter 36 is of the type conventionally used in pin-ball games and other amusement devices, in which a visible score indicating member is advanced each time the counter receives an electrical impulse. Mechanically linked to the score counter 36 is a clearing or reset solenoid 174, the function of which is to return the score counter to zero when the solenoid 174 is actuated.

Three additional counters, similar to the score counter 36 except that no provision is made therein to automatically return them to zero, are identified in the wiring diagram by the reference characters 172, 173 and 178. The function of the two counters 172 and 173 is to indicate the number of times each of two selected answers is correctly given, and the counter 178 indicates the total number of cards played. Thus, by so arranging the answer cards that certain answer numbers are correct for only a select group of questions, statistical data can be compiled as to public knowledge on certain subjects, when the machine herein described is used for the general amusement and edification of the public.

A solenoid 175 is mechanically connected to the interval timer 37 so that actuation of the solenoid 175 returns the interval timer to its initial or starting position. The interval timer itself contains a pair of normally open, single-pole, single-throw switches 180 and 181, respectively, which are mechanically closed by an electrical clock motor 182, the operation being such that the switch 180 is closed first and shortly thereafter the switch 181 is closed.

A chime 170 is provided and connected in parallel with the score counter 36 so that a chime is rung each time a correct answer is indicated.

Power for the operation of the unit is supplied through leads 158 under the control of a double-throw, single-pole switch 159.

For the purposes of describing the operation of the machine, let it be assumed that a break card is in the viewing window 24, and that switch 171 is therefore in closed position. Closure of the switch 171 serves to connect the coil of the solenoid 154 across operating voltage supplied through an above-ground-potential buss 190 and a ground return 191, thus moving the three contact blades 192, 193 and 194, of the relay 154 from their position shown in Figure 9.

Let it now be assumed that the "go" button 39 is depressed to initiate the operation of a card-displaying cycle. Depression of the "go" button 39 closes the blades 195 and 196 of switch 165 against their respective contacts. Closure of the contact blade 195 against its respective fixed contact which, as shown, is at ground potential, operates to complete a power circuit from said grounded contact in the switch 165 through a conductor 197, a closed switch blade 198 in the relay 155, a conductor 199, the operating coil of the relay 157, and a conductor 200, to the above-ground-potential buss 190. Completion of the power circuit through the relay 157 serves to close the switch blades 201 and 202 thereof. Closure of the blade 201 against the fixed contact 203 serves to deliver power to the motor 60 through the ground return 204.

It will be noted that the relay blade 198 in the relay 155 is closed by reason of the closed condition of the switch 140. It will be remembered that the switch 140 is closed only when the shutter is closed. In the event that the shutter should be open with a break card in the viewing window 24, the switch 140 would then be open also, the relay 155 un-energized, and the blade 198, as a consequence, open. Thus, the above mentioned power circuit to the motor-operating relay 157 could not be completed by depression of the "go" button 39. A parallel circuit to deliver power to the motor-operating relay 157 is provided through a conductor 220, thence through a blade 192 in the relay 154 (closed by reason of the break card sensing switch 171 being closed), thence through a conductor 221, and a conductor 222, to the coil of the relay 157. Thus it will be seen that the motor is started by depression of the "go" button 39, whether the shutter 26 be open or closed.

Closure of the switch blade 202 of the relay 157 against the grounded fixed contact 205 connects power across the shutter-closing solenoid 119 through the connectors 206 and 207, closing the shutter and the switch 140.

As soon as the motor 60 starts to operate, the switch-actuating roller 72 of the switch 73 is lifted out of the dwell 71, thus closing the switch 73 and connecting power from a grounded return 208 thereof through a connector 209 to the actuating coil of the relay 155, the latter being connected through a conductor 210 to the above-ground-potential buss 190. Thus, the relay 155 is energized and the contact blades 211 and 212 are in their lowermost positions at all times during which the motor is running. Closure of the upper blade 212 of the relay 155 against a fixed contact 214 serves to place a permanent ground on the relay 157, thus to keep the motor running, even after the "go" button 39 is released.

Closure of the blade 196 of the "go" switch 165 connects a ground connection 225 of the relay 155 through the lower switch blade 211 (initially in the position shown in Figure 9 until the motor limit switch 73 is closed), through a conductor 226, a conductor 227, a relay blade 194 in the relay 154 (in closed position due to the position of the break card), a conductor 228 to the counter reset solenoid 174, the other side of which is connected to the above-ground-potential buss 190, thus actuating the solenoid 174. Actuation of the solenoid 174 returns the score counter 36 to zero, in preparation for totalizing the score of the next group of cards.

Once the motor limit switch 73 has closed to energize the relay 156 and move the blade 211 downwardly, it is no longer possible to actuate the reset solenoid during the display of the next group of cards, since the circuit to the reset solenoid 174 is broken either by the switch blade 211 being in its lowermost position and/or the switch blade 194 in the relay 154 being in its uppermost position. Therefore, it is impossible to inadvertently reset the score counter 36 to zero before the total number of cards in a group of questions has passed through the machine and a break card again closes the switch 171.

It should be noted that whenever the shutter switch 140 is open and the relay 155 de-energized, an upper blade 230 thereof is against a fixed contact 231 connected by a conductor 232 to the timer reset solenoid 175. The blade 230 of the relay 155 is connected by a conductor 233 to a fixed contact 213 in the relay 156, which in turn is connected to the ground return 225 in the relay 155. Thus, whenever the motor switch 73 is open, and the shutter switch 140 is open, a circuit is completed to the timer reset solenoid 175, thus returning the timer 37 to zero, or starting position.

When the motor 60 has completed one cycle, moving a question card into the window 24, the motor limit switch 73 is opened by operation of the cam 70 which in turn de-energizes the relay 156. De-energization of the relay 156 moves the blade 212 thereof into position against the fixed contact 213, thus completing a circuit from the ground return connection 225 through the conductor 233, the upper switch blade 230 (closed by reason of the shutter being closed), through a conductor 235, through a switch blade 193 in the relay 154 (in uppermost position by reason of the break card switch 171 being open), through a conductor 236 to the timer 37. Completion of the circuit just described energizes the timer motor 182 and starts the answer period running. When all but ten seconds of the answer period has elapsed, the switch 180 is closed, energizing the warning light 176. Upon completion of the answering period, the switch 181 closes which, through a conductor 237, connects a ground return to the shutter opening solenoid 118, thus opening the shutter and also the shutter switch 140, which, as previously described, resets the timer to zero.

Thus far, the operations required to bring the first question card into the window 24 have been described. Now follows a description of the question-answering circuit and the score counters.

For convenience in reference, the four answer buttons have been marked A, B, C, and D, and the sensing switches 166 through 169 have been marked A, B, C, and D, in accordance with the answer button to which they are related. Also the two special question counters 172 and 173 have been marked B and D, thus indicating that whenever the correct answer to a question is given by pressing the button marked B or D, the equivalent special question counter will record this fact. The operator of the machine is, of course, unable to see the position of the notch and hence the operation of the sensing switches 166 through 169. Furthermore, the operator does not have access to the special question counters 172 and 173.

Let it now be assumed that a question card, the correct answer to which is given by depressing the button B, is in the window 24.

It will be remembered that the shutter 26 and switch 140 are closed, and hence the blades of the relay 155 in lowermost position, and the motor limit switch and the relay 156 are in open position. Therefore, a ground circuit is completed from the ground connection 225 through the relay blade 212, conductor 233, relay blade 230, conductor 235, relay blade 193, to the conductor 236. It will be seen from an examination of Figure 9 that the only source of ground potential to any of the contacts or blades in the push button switch 160 is through the conductor 236. It will also be noted that one side of each of the relays 150 through 153 is connected to the above-ground-potential buss 190, therefore connection of the other side of any of said last-mentioned relays to ground energizes the same to close the double-pole switch blades thereof.

Bearing in mind the conditions just stated, assume that any answer button is depressed with the B answer card in the window 24. The first effect of such depression is to open the shutter 26. This is accomplished by reason of the fact that one side of the shutter-opening solenoid 188 is connected to the conductor 237 and a common conductor 238 to one contact in each of the switches 161 through 164. An examination of the contacts 251 through 254 thus connected shows that depression of any one of the buttons 35 closes a circuit between the ground return conductor 236, and the conductor 238, thus to actuate the solenoid 118.

Since opening of the shutter 26 also opens switch 140 and hence the relay 155, the connection through the blade 230 is broken, and hence the ground connection to the common ground conductor 236 is broken, and further depression of any of the buttons 35 produces no results. Movement of the blade 230 in the relay 155 to the fixed contact 231 also resets the timer as previously described.

The results just described will occur regardless of which of the buttons 35 is depressed. However, if the button depressed is the B button, i. e., the correct answer to the card then in the window, the following additional results will occur. A switch blade 240 in the switch 162 will be closed against its fixed contact, thus completing a ground circuit from the common ground conductor 236 through switch blades 241, 242 and 243 in the other switches 161, 163 and 164, respectively, through the then-closed sensing switch 167, to the relay 151, thus closing the same. Closure of the blade 244 in the relay 151 completes a circuit from a ground connection 245 therein through a common conductor 246 to the score counter 36, thus advancing the same.

Closure of the other blade 247 in the relay 151 connects the ground connection 245 through a conductor 148 to the special question counter 172, thus recording the fact that a B question was correctly answered.

It will be noted that, by reason of the series connection of the switch blades 241, 242, and 243 with the switch blade 240, the simultaneous depression of any two or more buttons will produce no results since the circuit from the common ground connector 236 will not be completed.

Bearing in mind the preceding paragraph, it will be seen that unless provision were made to the contrary, simultaneous depression of two answer buttons 35 while having no effect on the score counter 36, would, through the operation of the contacts 251 through 254, open the shutter and de-energize the system making further play impossible without resetting. To obviate this result in the event two answer buttons should be inadvertently depressed at the same time, each of the contacts 251 through 254 is in a series circuit which includes a normally closed switch 255 in each of the other switch assembles 161—164. Thus, the ground return is broken if any two buttons are simultaneously depressed and the shutter opening solenoid 118 is not operated.

By reason of the parallel connection of the chime 170 with the score counter 36, the correct answer also rings the chime.

If no answer button is depressed during the answer time interval, as determined by the timer 37, operation of the switch 181, as previously described, will open the shutter and also the switch 140. As previously described, opening of the switch 140 breaks the ground connection with the common conductor 236, and thus makes actuation of any of the relays 150 through 153 impossible.

The arrangement of each of the switches 161, 163 and 164 is analogous to that described in connection with switch 162, i. e., that controlled by the B button. Depression of the correct answer button actuates the counter through the equivalent relay 150, 151, 152 or 153, and depression of any but the correct button opens the shutter and de-energizes the system so that the score cannot thereafter be advanced by depressing the correct answer button.

It will be noted that the relays 150 and 152, responsive to the answer buttons A and C, respectively, are provided with extra contacts whereby additional special question counters may be provided in order to keep an even more detailed record of answers than is provided in the present embodiment.

Each time the "go" button 39 is pressed to move a card through the window, the relay 157 is, as previously described, closed to actuate the motor. Actuation of the relay 157 also serves to close a ground return circuit from a fixed contact 205 through the switch blade 202 to close the shutter. Another conductor 251 is also connected to the switch blade 157 and leads to the total operation counter 178 which accordingly totalizes the number of cards passed through the machine (including break cards). Thus by a comparison of the readings of the special question counters 172 and 173 with the reading of the totalizer counter 178, a determination can be made of the percentage of correct answers to questions which are correctly answered by either the B or D buttons.

The scoring of the questions may be accomplished in various ways. For instance, each of the groups may be comprised of a series of equivalent questions with the same number of questions in each group. Then the score advance, for example, twenty points, for a correct answer of each of a group of five questions gives a perfect score of 100. Alternatively, the counter can be set to advance only ten points for a correct answer and a series of ten cards be placed in each group. The selection of questions in each group can be different, while maintaining the same number of questions in each group, or if desired, the different groups may have different numbers of cards with the maximum total score being printed on the break card following each group, whereby the player or operator can determine how close he came to a perfect score.

A particular advantage of presenting question and answer material in the manner of our invention lies in the fact that a pictorial representation of material such, for example, as an airplane to be identified, can be so printed on the card as to be partially obscured by the shutter. Upon pressing an answer button, the shutter is removed, revealing the entire picture.

While the machine shown and described herein is fully capable of achieving the objects and providing the advantages hereinbefore stated, it will be realized by those skilled in the art that it is capable of considerable modification without departing from the spirit of the invention. For this reason, we do not mean to be limited to the form shown and described, but rather to the scope of the appended claims.

We claim:

1. In combination in a quiz machine of the class described: a series of indicia elements each bearing a question; means forming a viewing station adapted to receive one at a time of said elements to display said question; a plurality of manually operable members, each adapted to indicate one of a plurality of possible answers to each of said questions, one of which answers is correct; score means operatively connected to said members and adapted to register a correct answer to a question then displayed in said station; means interconnecting said members and operatively connected to said score means whereby to deactivate the latter upon operation of any of said members except that indicating said correct answer; and advancing means independent of said operable members to move said indicia elements one at a time into said station, said advancing means being operatively connected to said score means to reactivate the same upon operation of said advancing means to move a new indicia element into said station.

2. In combination in a quiz machine of the class described: a series of indicia bearing elements, each having presented thereon, a question in one area of a given surface thereof and a correct answer to said question in another area of said surface; means forming a viewing station adapted to receive said indicia elements for observation by an operator; advancing means to present said elements, one after the other, at said viewing station to display said areas; physical codifying means in each of said elements, said codifying means being correlated with said correct answer; a plurality of sensing elements adjacent said station, each of said sensing elements being responsive to a particularly coded indicia element; a plurality of answering elements operable by said operator to answer a question in said station; score registering means; means connecting each of said answering elemeans through one of said sensing elements to said score means whereby operation of the answering element corresponding to the correct answer to the question then in said viewing station advances said score; means to initially obscure said answer area of an indicia element in said viewing station; and means responsive to operation of said answering elements, independent of said advancing means, and operatively connected to said obscuring means to reveal said answer upon operation of any one of said answering elements while leaving said indicia element in said viewing station whereby to permit visual comparison of said question and answer.

3. In a quiz machine of the class described: a series of indicia receiving elements, each having presented in a first area of a given surface thereof a question and a plurality of possible answers to said question, one of which answers is correct, said elements each having in a separate area of said surface, a second representation of said correct answer; advancing means to move and sequentially position said elements at a viewing station to display said first question area; means in each of said indicia elements to codify the same, said codifying means being formed in said element outside said areas in one of a number of discrete positions in accordance with said correct answer; a plurality of sensing elements adjacent said viewing station, said sensing elements being responsive to said indicia means and said codifying means whereby one only of said sensing elements is actuated differently from the others by each of said indicia elements when the latter is positioned in said viewing station; a plurality of manually operable members adjacent said station, each of said members corresponding to one of said possible answers whereby operation of one of said members answers said question; score registering means; means connecting each of said members through one of said sensing elements to said score means whereby actuation of said member corresponding to said correct answer of the indicia element then in said viewing station advances said score registering means; means adjacent said viewing station obscuring said separate answer area; means responsive to actuation of any of said indicatory members, and independent of said advancing means, to move said obscuring means to reveal said correct answer while leaving said indicia element then in said station immobile whereby to permit visual comparison of said question and revealed answer; and means responsive to said last mentioned means to deactivate said score means whereby to prevent advancement thereof by answering said question after said answer is revealed.

4. The construction set forth in claim 3 further characterized by having in said series of indicia elements, separatory elements similar in shape and size to said indicia elements, said separatory elements having formed therein discrete codifying means; a distinct sensing element adjacent said viewing station and responsive to said discrete codifying means; and score clearing means connected through said separate sensing element and adapted to clear said score registering means whenever said separatory element is positioned in said viewing station.

5. The construction set forth in claim 3 further characterized by having timer means operatively connected to said obscuring means and adapted to move said obscuring means to reveal said correct answer at a predetermined time after the initial placement of said indicia element in said viewing station whereby to prevent advancement of said score means after said predetermined period.

6. In a quiz machine of the type in which a plurality of indicia bearing elements are sequentially presented at a viewing station and in which means are provided to indicate answers to questions on said indicia bearing means and further totalizing means are provided to register the score of correct answers to said questions, question grouping means comprising: a plurality of separatory elements similar in size and shape to said indicia elements and distributed at intervals in said series of indicia elements, said separatory elements having codifying means formed therein; a sensing element adjacent said viewing station responsive to said codifying means; and means under the control of said sensing means to clear said score totalizing means.

7. In combination in a quiz machine of the class described: a series of indicia bearing elements, each having presented thereon, a question in one area thereof and a correct answer to said question in another area thereof; means forming a viewing station adapted to receive said indicia elements for observation by an operator; physical codifying means in each of said elements, said codifying means being correlated with said correct answer; a plurality of sensing elements adjacent said station, each of said sensing elements being responsive to a particularly coded indicia element; a plurality of answering elements operable by said operator to answer a question in said station; score registering means; means connecting each of said answering elements through one of said sensing elements to said score means whereby operation of the answering element corresponding to the correct answer to the question then in said viewing station advances said score; means interconnecting said answer elements adapted to deactivate said score means whereby to prevent advancement thereof after operation of an answer element corresponding to an incorrect answer to the question then in said viewing station; and advancing means independent of said answering elements to present said indicia elements one after the other at said viewing station to display said areas thereon, said advancing means being operatively connected to said score means to reactivate the same upon operation of said advancing means to move a new indicia element into said station.

8. In combination in a quiz machine of the class described: a series of indicia bearing elements, each having presented thereon, a question in one area thereof and a correct answer to said question in another area thereof; means forming a viewing station adapted to receive said indicia elements for observation by an operator; physical codifying means in each of said elements, said codifying means being correlated with said correct answer; a plurality of sensing elements adjacent said station, each of said sensing elements being responsive to a particularly coded indicia element; a plurality of answering elements operable by said operator to answer a question in said station; score registering means; means connecting each of said answering elements through one of said sensing elements to said score means whereby operation of the answering element corresponding to the correct answer to the question then in said viewing station advances said score; means interconnecting said answer elements, adapted to deactivate said score means whereby to prevent advancement thereof upon simultaneous operation of any two of said answering elements; and advancing means independent of said answering elements to present said indicia elements one after the other at said viewing station to display said areas thereon, said advancing means being operatively connected to said score means to reactivate the same upon operation of said advancing means to move a new indicia element into said station.

9. In a quiz machine of the type in which a plurality of indicia bearing elements are sequentially presented at a viewing station, and in which means are provided to indicate answers to questions on said indicia bearing means, and further totalizing means are provided to register the score of correct answers to said questions, said totalizing means including means to clear said score registered thereby, question grouping means comprising: transporting means to move said indicia bearing elements one at a time into said station, said transporting means including a manual control which is operated to bring each successive element into said station; a plurality of separatory elements similar in size and shape to said indicia elements and distributed at intervals in said series of indicia elements whereby to be periodically moved into said station by operation of said control member, said separatory elements having codifying means formed therein; a sensing element adjacent said viewing station responsive to said codifying means; and correlating means interconnected between said operating member, said sensing element and said totalizing means, whereby operation of said operating member when one of said separatory elements is in said station operates to clear said score totalizing means.

10. In a quiz machine of the type in which a plurality of indicia elements, each bearing a question and a correct answer thereto in different areas of a given surface thereof, are sequentially presented at a viewing station to display said question and in which manually actuated means are provided to indicate answers to said questions, and further means are provided to record said indicated answers when correct, exhibiting means comprising: means to initially obscure said answer area of an indicia element in said viewing station; and means interconnecting said manually actuated means and said obscuring means and independent of movement of said indicia elements adapted to remove said obscuring means to expose said correct answer upon actuation of the former.

11. The construction of claim 10 further characterized by having timer means connected to said obscuring means and adapted to remove the same and expose said answer after a predetermined time of display of said question.

12. The construction of claim 11 further characterized by having means connected between said timer means and answer recording means adapted to deactivate the latter upon said removal of said obscuring means whereby to prevent recordation of a correct answer after exposure of said correct answer.

13. In a quiz machine of the type in which a plurality of indicia elements, each bearing a question and a correct answer thereto in different areas thereof, are sequentially presented at a viewing station to display said question and in which manually actuated means are provided to indicate answers to said questions, and further means are provided to register said indicated answers when correct, exhibiting means comprising: means to initially obscure said answer area of an indicia element in said viewing station; means interconnecting said manually actuated means and said obscuring means adapted to remove the latter and expose said correct answer upon actuation of the former; and means interconnecting said registering means and said manually actuated means adapted to deactivate the former whereby to prevent registration of a correct answer to a particular question in said viewing station after an initial operation of said manually actuated means.

14. In a machine of the class described and of the type in which a plurality of separate coded elements are sequentially presented at a sensing station, apparatus for storing and moving said elements comprising: a magazine adapted to receive a supply of said elements; a carriage adapted for limited reciprocal movement adjacent said magazine to engage one at a time of said elements and carry the same out of said magazine; transporting means adjacent a limit of travel of said carriage, said transporting means being adapted to engage an element carried by said carriage and lift the same from said carriage to a position adjacent said sensing station; ejector means adjacent said transporting means adapted to move said element out of said transporting means and into said sensing station; discharge means adjacent said sensing station adapted to engage said element therein and thereafter discharge the same into said magazine; and correlated drive means including power means to reciprocate said carriage, thrust means connecting said carriage and transporting means to move the latter during one predetermined part of the motion of said carriage, second thrust means to operate said ejector means during another predetermined part of the motion of said carriage, and intermittent drive means connected between said power means and discharge means to intermittently operate the latter at predetermined intervals.

15. In a machine of the class described and of the type in which a plurality of separate coded elements are sequentially presented at a sensing station, apparatus for storing and moving said elements comprising: a magazine adapted to receive a stack of said elements, said magazine having at an end of said stack an exit opening positioned and adapted to permit withdrawal of one only at a time, of said elements from said magazine and having an entrance at the opposite end of said stack from said exit opening; a member adjacent said exit opening positioned and adapted for limited reciprocal movement to engage and carry said elements one at a time through said exit; jaw means adjacent a limit of travel of said reciprocal member, said jaw means being adapted to grip an element carried by said member and move the same into a position adjacent said sensing station; ejector means adjacent said jaw means positioned and adapted to move said element gripped by said jaw means out of the same and into said sensing station; discharge means adjacent said sensing station adapted to engage said element when moved into said sensing station and thereafter move the same out of said sensing station and through said entrance into said magazine; and correlated drive means for said reciprocal member, jaw means, ejector means, and discharge means, comprising power means to reciprocate said reciprocal member, a first lost motion connection between said reciprocal member and jaw means to move the latter during a predetermined part of the motion of said reciprocal member, a second lost motion connection between said reciprocal member and ejector means adapted to move the latter during another predetermined part of the motion of said reciprocal member, and an intermittent drive connection between said power means and discharge means to periodically operate the latter at predetermined intervals.

16. In combination in a quiz machine of the class described: a series of cards each having a question presented thereon, and physical codifying means formed therein correlated with a correct answer to said question; means forming a viewing station adapted to receive and support said cards, one at a time, to display said question; means to transport said cards, one at a time, into said viewing station; a plurality of manually operable members, each adapted to indicate one of a plurality of possible answers to each of said questions, one of which answers is correct; score means operatively connected to said members and responsive to said codifying means to register a correct answer to a question then in said station; means interconnecting said members and operatively connected to said score means whereby to deactivate the latter upon operation of any of said members except that indicating said correct answer; and means independent of said operable members and operatively connected between said transport means and score means to reactivate the latter upon operation of said transport means to move a new card into said station.

17. In a quiz machine of the class described: a series of indicia receiving cards, each having presented in a first area thereof a question and plurality of possible answers to said question, one of which answers is correct, said cards each having in a separate area thereof a second representation of said correct answer; means to store said cards and sequentially position the same, one at a time, at a viewing station to display said question area; means formed in each of said cards to codify the same, said codifying means being formed in an area of said card outside said question and answer areas, and in one of a number of discrete positions in accordance with said correct answer; a plurality of sensing elements mounted adjacent said viewing station, said sensing elements being responsive to said codifying means in said cards whereby one only of said sensing elements is actuated differently from the others by each of said cards when the latter is positioned in said viewing station; a plurality of manually operable members adjacent said station, each of said members corresponding to one of said possible answers whereby operation of one of said members answers said question; score registering means; means connecting each of said members through one of said sensing elements to said score means whereby actuation of said member corresponding to said correct answer of the card then in said station advances said score registering means; means adjacent said station initially obscuring said separate answer area; means responsive to actuation of any of said indicatory members to move said obscuring means whereby to reveal said correct answer; and means responsive to said last mentioned means to deactivate said score means whereby to prevent advancement thereof by answering said question after said correct answer is revealed.

18. The construction set forth in claim 17 further characterized by having in said series of cards a plurality of separatory cards similar in shape and size to said question cards, said separatory cards having formed therein codifying means in a different position from said codifying means in said question cards; a separate sensing element adjacent said viewing station and responsive to said codifying means in said separatory cards; and score clearing means connected through said last-mentioned sensing element and adapted to clear said score registering means whenever one of said separatory cards is positioned in said station.

19. The construction set forth in claim 17 further characterized by having timer means operatively connected to said obscuring means and adapted to move said obscuring means to reveal the correct answer area of the card then in said station at a predetermined time after the initial placement of said card in said station whereby to prevent advancement of said score means after said predetermined period.

20. In a machine of the class described and of the type in which a plurality of separated codified cards are sequentially presented at a sensing station, apparatus for storing and moving said cards comprising: a magazine adapted to receive a stack of said cards, said magazine having at a lower end thereof an exit opening positioned and adapted to permit withdrawal of one only at a time of said cards from said magazine and having an entrance adjacent the top of said stack; a movable lower wall for said magazine adapted to support said stack of cards thereon and further adapted for limited reciprocal movement to engage and carry one of said cards at a time through said exit to a position below and spaced from said sensing station; a pair of pivotally mounted jaws adjacent said last-mentioned position, said jaws being adapted to grip said card carried by said wall and tip the same upwardly into a position immediately adjacent said sensing station; a pair of slidable ejectors adjacent said last-mentioned position adapted to move into engagement with said card gripped by said jaws and to move said card out of said jaws and into said sensing station; a pair of rollers mounted adjacent said sensing station on a side opposite from said ejectors, said rollers being positioned and adapted to receive said card for friction engagement therebetween when said card is moved into said sensing station, said rollers being further positioned and adapted when rotated, to move said card therebetween through said entrance into said magazine; and correlated drive means for said reciprocal wall, jaws, ejectors, and rollers, comprising a source of rotary power, a crank rotated thereby, a connection between said crank and reciprocal wall whereby to reciprocate said wall as a result of rotation of said power source, a lost motion thrust member connected between said reciprocal wall and said jaws adapted to tilt said jaws during one predetermined part of the motion of said reciprocal wall, a second lost motion connection member connected between said reciprocal wall and said ejectors, said second lost motion connection member being adapted to move said ejectors during another predetermined part of the motion of said reciprocal wall, and an intermittent rotary drive comprising a mutilated driving roller connected to said power source and a driven friction roller connected to intermittently rotate said card gripping rollers at predetermined intervals.

21. In a machine of the class described and of the type in which a plurality of separate codified cards are sequentially presented at a sensing station, a circuit for comparing data supplied to said machine with data carried by said cards which comprises: a plurality of normally closed sensing switches adjacent said sensing station, said switches having operating means adapted to be engaged by a card in said sensing station whereby all but one of said sensing switches are opened by a card in said station, said one switch remaining closed depending on the codification of the card then in said station; a plurality of separate normally open, manually operated data input switches, one connected in series with each of said sensing switches; a plurality of relays, each having an operating coil connected in series with one of said data switches and said associated sensing switch; a main electric power source connected to said associated relays and switches in a series parallel circuit whereby closure of the data switch connected to the sensing switch remaining closed operates the relay connected to said data switch; and means including contacts operated by said relays to register the operation thereof.

22. The construction set forth in claim 21 further characterized by having a plurality of normally closed blocking switches each mechanically connected to one of said data switches whereby closure of any one of said data switches opens at least one of said blocking switches and said blocking switches being electrically connected into a plurality of series circuits, each of said series circuits being in turn connected in series with one of said data switches and said power source whereby operation of more than one at a time of said data switches breaks said power circuit.

23. The construction set forth in claim 22 further characterized by having a second plurality of normally closed blocking switches each mechanically connected to one of said data switches whereby closure of one of said data switches opens at least one of said second blocking switches and said second blocking switches being electrically connected into a plurality of series circuits and each of the last-named series circuits being connected in series with one of said deactivating switches whereby operation of more than one at a time of said data switches opens said series circuits to prevent deactivation of said registering means.

24. The construction set forth in claim 21 further characterized by having: a plurality of normally open deactivating switches, said deactivating switches each being mechanically connected to one of said data switches; and circuit means including said deactivating switches operatively connected to said register means whereby to deactivate the same and prevent further registering of data correlated with a card then in said viewing station after one closure of any one of said data switches.

25. In a machine of the class described and of the type in which a plurality of separate codified cards, each bearing indicia on a face thereof, are sequentially presented at a sensing station, means for comparing data supplied to said machine with said indicia which comprises: means to move said cards one at a time into said sensing station and display said indicia bearing surface; movable shutter means at said station normally partially obscuring said indicia bearing surface; a plurality of normally closed sensing switches adjacent said sensing station, said switches having operating means adapted to be engaged by a card in said sensing station whereby all but one of said sensing switches are opened and said one only of said sensing switches remains closed with a card in said station, said closed switch depending on the codification of the card then in said station; a plurality of normally open, manually operated data input switches, one connected in series with each of said sensing switches; a plurality of relays each having an operating coil connected in series with one of said data switches and said associated sensing switch; a main electric power source connected to said associated relays and switches in a series parallel circuit whereby closure of the data switch connected to the sensing switch remaining closed operates the relay connected to said data switch; means including contacts operated by said relays to register the operation thereof; and means including a plurality of switches one mechanically connected to each of said data switches to remove said shutter means to reveal all of said indicia bearing surface upon operation of any one of said data switches.

26. The construction set forth in claim 25 further characterized by having a plurality of normally closed blocking switches, each mechanically connected to one of said data switches, whereby closure of any one of said data switches opens at least one of said blocking switches, and said blocking switches being electrically connected into a plurality of series circuits, each of said series circuits being in turn connected in series with one of said shutter means switches whereby operation of more than one at a time of said data switches opens said series circuits to prevent movement of said shutter means.

27. In a quiz machine of the class described: a plurality of indica receiving cards, each having printed in a first question area theerof, a question and a plurality of numbered possible answers to said questions, one of which answers is correct, said cards each having said correct answer reprinted in a separate answer area thereof, and having formed in the edge thereof in an area outside said question and answer areas, a notch, said notch being positioned at a predetermined distance along said edge in accordance with the number of said correct answer, said cards being arranged in a stack; a plurality of separatory cards similar in size and shape to said first mentioned cards, said separatory cards having formed in an edge thereof a notch differently positioned from the notches in any of said first mentioned cards, said separatory cards being stacked with said first mentioned cards and distributed at intervals in said stack; a magazine adapted to receive said stack of cards, said magazine having at a lower end thereof an exit opening positioned and adapted to permit withdrawal of one only at a time of said cards from said magazine and having an entrance adjacent the top of said stack; means defining a sensing station forward of said magazine; a movable lower wall for said magazine adapted to support said stack of cards thereon and further adapted for limited reciprocal movement to engage and carry one of said cards at a time forwardly through said exit to a position below and spaced from a sensing station; a pair of pivotally mounted jaws adjacent said last mentioned position, said jaws being adapted to grip said card carried by said wall and tip the same upwardly into a position immediately adjacent said sensing station; a pair of slidable ejectors adjacent said last mentioned position adapted to move into engagement with said card, gripped by said jaws and move said card out of said jaws and into said sensing station; means above said sensing station forming a window through which said question and answer areas may be viewed; a pair of rollers mounted adjacent said sensing station on a side opposite from said ejectors, said rollers being positioned and adapted to receive said card for friction engagement therebetween when said card is moved into said sensing station, said rollers being further positioned and adapted when power rotated to move said card rearwardly therebetween through said entrance into said magazine; correlated drive means for said reciprocal wall, jaws, ejectors, and rollers, comprising a source of rotary power, a crank rotated thereby, a connection between said crank and reciprocal wall whereby to reciprocate said wall as a result of rotation of said power source, a lost motion thrust member connected between said reciprocal wall and said jaws adapted to tilt said jaws during one predetermined part of the motion of said reciprocal wall, a second lost motion connection connected between said reciprocal wall and said ejectors, said second lost motion connection member being adapted to move said ejectors during another predetermined part of the motion of said reciprocal wall, and an intermittent rotary drive comprising a mutilated driving roller connected to said power source and a driven friction roller connected to intermittently rotate said card gripping rollers at predetermined intervals; a plurality of normally closed answer sensing switches adjacent said sensing station and out of the area viewed through said window, said switches having operating means adapted to be engaged by the notched edge of a card in said sensing station whereby one only of said answer sensing switches remains closed with a card at said station, said closed switch depending on the notch position of the card then in said station; a separate normally closed, sensing switch adjacent said sensing station, said separate sensing switch having an operating element adapted to contact the notched edge of said cards whereby to open the same, said switch being positioned and adapted to remain closed only when one of said separatory cards is in said sensing station; a plurality of normally open, manually operated answering switches, one connected in series with each of said sensing switches, said answering switches being numbered identically to the numbering of the plurality of answers in said question area; a plurality of relays, each having an operating coil connected in series with one of said answering switches and said associated sensing switch; a main electric power source connected to said associated relays and switches in a series parallel circuit whereby closure of the answering switch connected to the answer sensing switch closed by a card then in said sensing station operates the relay connected to said answering switch to indicate a correct answer; means including an electrically operated score counter and contacts in said relays to register said correct answers; means including a plurality of switches, one mechanically connected to each of said answering switches to remove said shutters to reveal said correct answer upon operation of any one of said answering switches; and circuit means to clear said score counter, said score clearing circuit including said separate sensing switch whereby said score counter is adapted to be cleared only when one of said separatory cards is in said sensing station.

MALCOLM C. WILLIAMS.
FLOYD L. WILLIS.

REFERENCES CITED

The following references are of record in the file of this patent:

UNITED STATES PATENTS

| Number | Name | Date |
| --- | --- | --- |
| 2,311,055 | Kopas | Feb. 16, 1943 |
| 2,340,251 | Nesbit | Jan. 25, 1944 |